United States Patent [19]

Hovey

[11] 4,049,846

[45] Sept. 20, 1977

[54] PHOTOCHROMIC PLASTIC MATERIALS

[75] Inventor: Richard J. Hovey, Sturbridge, Mass.

[73] Assignee: American Optical Corporation, Southbridge, Mass.

[21] Appl. No.: 694,963

[22] Filed: June 11, 1976

[51] Int. Cl.$^2$ .......................... G02F 1/01; G02B 1/10; G02B 1/12; B05D 5/06

[52] U.S. Cl. .................................. 427/164; 96/90 PC; 350/160 P; 428/913

[58] Field of Search .............. 427/164, 165; 428/913; 350/160 P; 96/90 PC

[56] References Cited

U.S. PATENT DOCUMENTS

| | | |
|---|---|---|
| 3,208,860 | 9/1965 | Armistead et al. ........... 96/90 PC X |
| 3,419,370 | 12/1968 | Cramer et al. .................... 427/165 X |
| 3,779,775 | 12/1973 | Chiba et al. .................... 96/90 PC X |
| 3,950,591 | 4/1976 | Gliemeroth et al. ......... 96/90 PC X |

*Primary Examiner*—James R. Hoffman
*Attorney, Agent, or Firm*—Kenway & Jenney

[57] ABSTRACT

A method for producing photochromic plastic materials is disclosed which is characterized by forming a transparent polymeric shape from a mixed polymer consisting of a polyester resin made by esterification of an unsaturated polybasic organic acid with a polyhydric alcohol, and a polar vinyl monomer, swelling a surface layer of the cured polymeric shape with a polar solvent, absorbing silver and halide ions into the swelled surface layer, and collapsing the swelled surface layer.

21 Claims, 1 Drawing Figure

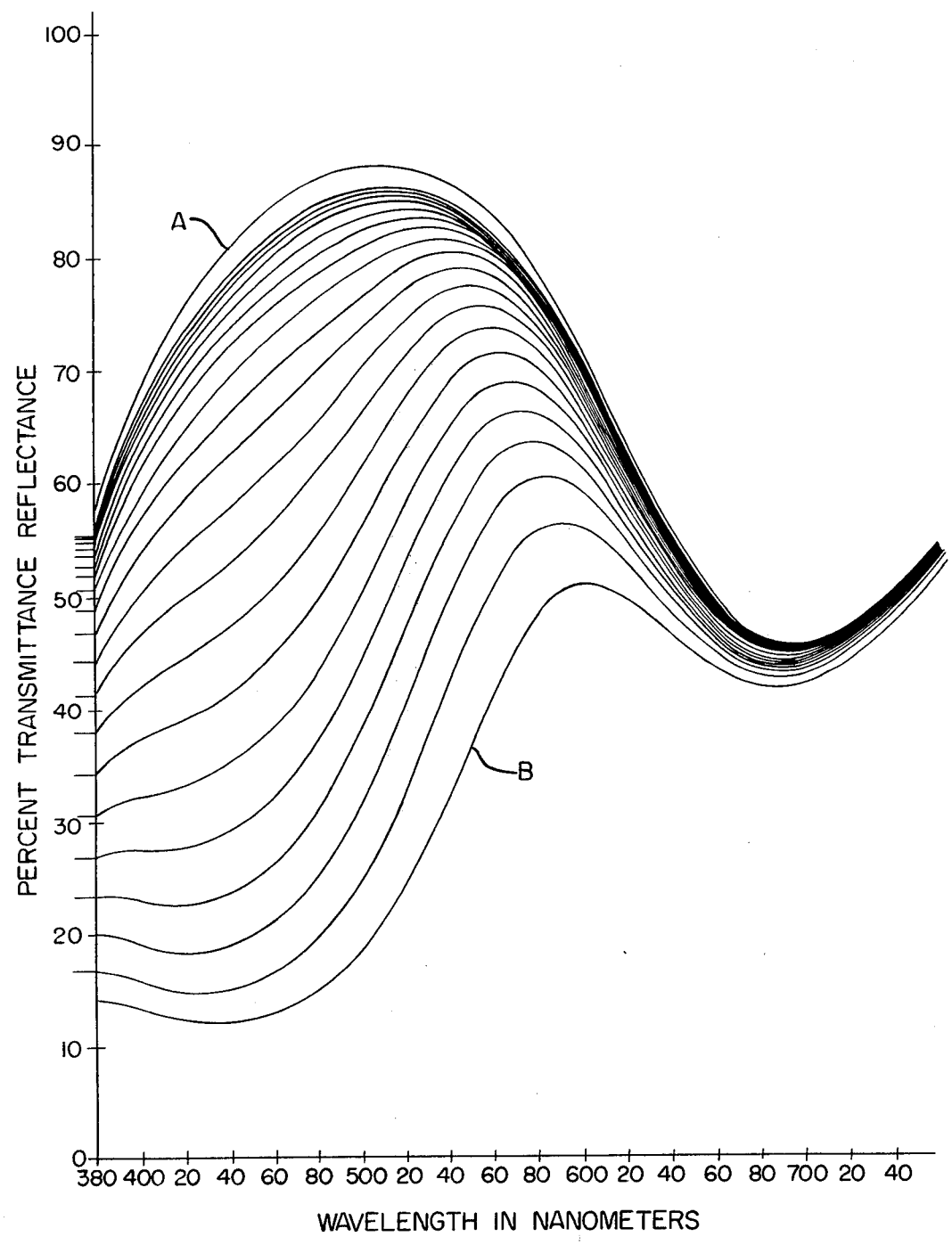

PHOTOCHROMIC PLASTIC MATERIALS

BACKGROUND OF THE INVENTION

This invention relates to a light sensitive plastic element whose absorbance varies directly with the intensity of ambient activating radiation. More particularly, it relates to transparent polymeric materials having photosensitive silver halide absorbed into the structure of the surface layer thereof, which silver halide can undergo a reversible, light induced chemical change wherein light absorbing species and nonabsorbing species are alternately produced depending on the intensity of ambient electromagnetic radiation.

Silver halides have several advantages over organic photochromic materials as an operative photochromic element. First, when properly treated, they are inherently stable and hence fatigue free, i.e., do not lose their photochromic properties in repeated exposures to activating radiation. Second, on activation, the light transmittance of silver halide based photochromic articles decreases over the entire visible spectrum resulting in activated gray or gray-brown shades.

Attempts to impart silver halide based photochromic properties to windows, lenses and other articles made from transparent polymeric materials have not, in general, been overly successful. While it is well known that silver halides undergo a chemical change which results in a light absorbing species, it is not altogether clear what features of the environment of such photosensitive silver halides must be controlled in order to assure that the activated species, in the absence of activating radiation, will return to its light transmissive state in a reasonable period of time.

One condition that seems to be important is that the silver halide crystals must be shielded from the effects of the chemistry present in polymerizing materials, i.e., catalysts and initiators, which in general have a deactivating effect on the photosensitive crystals. For this reason, in contrast to the conditions present in silver halide based photochromic glass, it is not possible simply to form silver halide crystals directly in prepolymers which thereafter may be polymerized to form optical devices.

Another aspect of the silver halide crystal environment which seems to be important is that the material surrounding the photosensitive crystals must define a barrier which can prevent any substantial diffusion of halogen, since recombination of halogen and the activated silver species which is believed to occur during recovery is obviously not possible if the halogen is lost.

Still another important parameter is the size of the silver halide crystal which is incorporated into the host material. In this regard, it appears that crystals over 1 micron in diameter either do not undergo reversible, light-activated reactions, or do so to a degree insufficient to impart significant photochromism to host materials.

SUMMARY OF THE INVENTION

In accordance with the present invention, it has been discovered that certain transparent polymers may, after formation, have silver halide based photochromism imparted thereto by sequential immersion in a silver solution and a halide solution. The polymers with which this process is useful comprise two classes of components which have been found to be critical. The first component comprises a transparent unsaturated polyester resin produced by esterification of a polybasic unsaturated acid, e.g., maleic acid, with a polyhydric alcohol, e.g., ethylene glycol. This resin, during formation, may optionally be mixed with up to about 70 percent of one or more unsaturated vinyl monomers to form translucent copolymers, terpolymers, etc. The second component consists of a polar vinyl monomer, e.g., compounds such as N-vinyl pyrrolidone, acrylic acid, etc.

As long as the ratio of the first component to the second is kept within the range of between about 0.1 and 100, mixed copolymers result which are characterized by a structure which can absorb silver and halide ions and thereafter exhibit photochromic behavior.

The reasons why this particular polymer mixture is useful in the process is not thoroughly understood. However, when the materials of the invention are immersed in polar solvents such as methanol, a swelling occurs which results in the formation of a gel structure on the surface of the material. From observations, it appears that there is no appreciable dissolving of the plastic structure in the solvent. Both halide and silver ions freely diffuse into this gel-like surface structure during immersion. The order of the two immersions is not particularly important although best results are achieved by immersion first in halide solution and then in silver solution. The halide ions which are present in the structure after a first immersion react with silver ions diffusing into the swelled surface layer during a subsequent immersion to form insoluble silver halide particles. Unpredictably, the dimensions of the gel pores or channels apparently are such that the growth of silver halide crystals is restricted to a size appropriate for exhibiting photochromism, i.e., 30 to 1000 Angstroms, or more likely, since no haziness is observed in optically clear polymers, 30 to 500 Angstroms. After evaporation of the solvent phase of the silver and halide solutions, the surface gel structures collapses, trapping the desired silver halide particles in the surface layer of the plastic and providing a photochromic material which exhibits rapid recovery.

Accordingly, it is an object of the invention to provide a process for producing silver halide based photochromic plastic materials.

Another object of the invention is to provide photochromic plastic materials wherein the time necessary for the material to return to its original color after activation is advantageously short.

Still another object of the invention is to provide a family of transparent plastics which may be rendered photochromic by sequential immersion in solutions of halide and silver ions.

Another object of the invention is to provide a method of treating certain optically clear plastic articles to impart photochromism thereto.

Another object of the invention is to provide a family of photochromic coatings useful for imparting photochromic behavior to translucent articles.

BRIEF DESCRIPTION OF THE DRAWING

The sole FIGURE of the drawing is a graph showing the spectral transmittance of a photochromic plastic material embodying the invention before and after activation and at 1 minute intervals during recovery.

DESCRIPTION OF THE PREFERRED EMBODIMENT

To fabricate the photochromic plastic materials of the invention, it is necessary to first produce a transparent polymeric element containing two essential components: an unsaturated polyester resin produced by esterification of a polybasic unsaturated organic acid with a polyhydric alcohol; and a polar vinyl monomer of the type which forms polar solvent soluble plastic when homopolymerized. Those skilled in the art will have little difficulty selecting suitable components within these two general categories. Many species of the first component are available commercially and are distributed for use in, for example, encasing biological specimens and forming optically clear lenses and other optical devices. One such polyester resin is available from Wards of Rochester, N.Y. under the tradename Bioplastic. Other suitable resins may be made by esterification of unsaturated acids such as maleic and fumaric acids with polyhydric alcohols, such as ethylene glycol, diethylene glycol, 2', 2'-dimethylpropanediol, etc. It should be pointed out that a very wide variety of polyester resins are useful, so long as they are unsaturated in the acid monomer component as described.

Clear casting resins of this type are frequently partially polymerized and mixed with one or more unsaturated vinyl monomers such as styrene, vinyl toluene, acrylic esters, methacrylic esters, vinyl acetate, etc. which to varying degrees impart desirable hardness to he polyesters. Styrenes are preferred hardening resins because of their low cost. Accordingly, up to 70% unsaturated vinyl monomer, based on the weight of the polyester, may be added to the polyester for conventional purposes without serious detriment to the photochromic plastics of the invention. Allyl type esters, such as diethylene glycol bis (allyl carbonate), diallyl maleate, diallyl fumarate, diallyl benzene phosphonate, etc., copolymerized with vinyl type monomers are particularly useful. Diethylene glycol bis (allyl carbonate) forms copolymers with unsaturated vinyl type monomers which, advantageously, are optically clear, resistant to scratches, and particularly well adapted for the process of the invention.

The second critical component of the mixed polymer material of the invention comprises vinyl monomers of the type having the general formula:

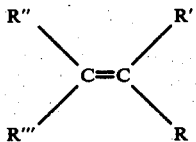

where R is a polar organic functionality and R', R" and R''' are hydrogen or a lower alkyl such as methyl or ethyl. The following polar vinyl monomers comprise nonlimiting examples of useful components:

1. N-vinyl pyrrolidone
2. vinyl acetate
3. vinyl succinamide
4. vinyl phthalimide
5. acrylic acid
6. 2-methacrylic acid
7. 3-methacrylic acid
8. vinylacetic acid
9. 3-vinylpropionic acid
10. 4-vinylpyridine
11. 5-vinyl-2-picoline
12. vinylformamide
13. vinylacetonitrile
14. acrylimide When a transparent species of the class of the second component, or compatible mixtures of such species, are mixed with a member of the class of the first component in about a 0.1 to 100 (first component: second component) ratio by weight, a polymeric shape may be cast by adding various types of peroxide initiators and azo compounds, well known to those skilled in the art, to initiate polymerization. Nonlimiting examples of such initiators include acetyl benzoyl peroxide, paracetic acid, methyl ethyl ketone peroxide, cyclohexanone peroxide, and cyclohexyl hydroperoxides. Various activators and promoters may also be used for varying the curing properties of the polymers of the invention in a known manner, e.g., cobalt salts may be used with ketone peroxide.

In the process of the invention, a prepolymer mixture is prepared using one or more species of the class disclosed above as the first component with or without an unsaturated vinyl monomer. After adding and thoroughly mixing a selected second component, polymerization is effected in a mold of a desired shape, and, after the plastic shape has gelled, it is removed from the mold and cured by conventional techniques.

Alternatively, prior to polymerizing the selected first and second component, the prepolymer mix may be coated on the surface of an article to impart photochromic behavior thereto. This coating step may be accomplished by any of the large number of known conventional techniques. Thereafter, polymerization is effected and the gelled coating is cured.

The next step of the process is to swell a surface layer of the polymeric shape or coating. This may be accomplished by immersing the material in a polar solvent, or preferably, by immersing the material in a solution of a polar solvent and either silver of halide ions. If the latter procedure is followed, two solutions are prepared using a polar solvent capable of both swelling the surface of the formed polymeric shape and solubilizing silver and halide ions. The solutions may be made from the same polar solvents or different compatible ones. One should contain halide ions chosen from the group consisting of bromide, chloride, iodide, and mixtures thereof. In addition, this solution may contain one or more cations which, in accordance with known technology, are capable of serving as hole traps in silver halide photosensitive particles which sensitize the silver halide crystals to increase photochromic behavior.

While a preferred solvent for these solutions is methanol, and while methanol is the only solvent employed in the examples which follow, it will be apparent to those skilled in the art that other solvents will be useful, e.g., water or ethanol, and that mixed polar solvents will be operable. The best solvent for a particular polymer will depend on the nature of that polymer. In selecting a suitable solvent, it should be kept in mind that its function is to dissolve silver and halide ions and to swell the surface of the transparent material. Also, the selected solvent should have no deleterious effect on the light transmissive properties of the cast plastic material.

The cast plastic shape or coated article is then immersed in one of the two solutions for a sufficient amount of time to allow swelling of a surface layer thereof and absorption of the ions of interest. In this regard, the duration of the immersion will generally be on the order of between 2 minutes and ½ hour or more, depending on the solvent chosen and the composition of the plastic.

Thereafter, the plastic shape is thoroughly rinsed with the solvent to remove ions which have not been absorbed and then immersed in the second solution for a period of time generally on the order of 2 minutes to ½ hour. During the second immersion, the ions of interest are absorbed into a surface layer on the plastic material where they combined with the ions from the first absorption to form fine silver halide crystals in the pores of the polymeric material. After another thorough rinsing, the polymeric material is dried. A clear plastic shape or plastic coated article is thereby formed, which, on irradiation with suitable activating electromagnetic radiation, turns dark, and on removal of the source of radiation, recovers in a few minutes to a few hours.

The invention will be further understood from the following examples which are intended to be illustrative of the process of the invention and should in no sense be construed as limiting.

EXAMPLE 1

A plastic plate was prepared by mixing 27.1 g of a polyester resin (Bioplastic from Wards, Rochester, N.Y.) with 12.9 g of the polar vinyl monomer, acrylic acid. This mixture was catalyzed with 2.8 g of methyl ethyl ketone peroxide, and the prepolymer mixture was poured into a flat glass mold with an internal thickness of 3 mm. After allowing 1 hour for the forming material to reach the gel state, the soft plate was picked from the mold and left to sit at room temperature for 40 hours.

The plate was then immersed in a 20% cupric chloride solution in methanol at room temperature for 12 minutes. After removal from the cupric chloride-methanol bath, the plate was thoroughly rinsed with methanol and then immersed in a saturated solution of silver nitrate in methanol for 12 minutes at room temperature. After removal from the silver nitrate bath, the plate was again thoroughly rinsed with methanol and heated in an oven at 90° C for 15 minutes in order to remove imbibed methanol from the surface layers.

A plastic plate was produced which was perfectly transparent, light blue in color, and turned a brown color when activated by ultraviolet light. The spectral transmittance of this photochromic plastic material before and after activation, as well as at 1 minute intervals during recovery, is shown in the sole FIGURE of the drawing. The transmittance curve of the plastic plate prior to any irradiation is shown at A. Curve B shows the transmittance of the plate after a 90 second irradiation with a Black-Ray light from a distance of 2.5 cm. The transmittance curves between curves A and B were taken at 1 minute intervals after the irradiation, i.e., during the recovery period. As can be seen from the graph, the plate returned to essentially its original state in 20 minutes.

EXAMPLE 2

A prepolymer mixture was prepared by dissolving 16 g of acrylic acid in 24 g of Bioplastic. 2.8 g of methyl ethyl ketone peroxide were dissolved in the mixture just prior to pouring it into a flat glass mold. After gellation had occurred, the soft plastic plate was picked from the mold and allowed to cure at room temperature for 20 hours.

The plate was then immersed in 20% cupric chloride solution in methanol for 5 minutes. After thorough rinsing with methanol, it was immersed in a solution of methanol saturated with silver nitrate. After removal from the silver nitrate bath, it was again thoroughly rinsed with methanol and heated at 65° C for 20 minutes. The formed plate showed moderate photocoloration with a very fast thermal recovery (3-4 minutes).

EXAMPLE 3

The procedure for example 2 was repeated except that prior to imbibing the halide and silver salts, the plate was cured at 65° C for 3 hours. This more thorough curing process yielded a photochromic plate which exhibiting stronger photocoloration then example 2, but which was characterized by a longer recovery period. (Approximately 20 minutes.)

EXAMPLE 4

The plastic formulation and curing cycle of this example was the same as in example 1, but the plate was first immersed in a saturated solution of sodium chloride in methanol (rather than 20% cupric chloride as in example 1) for 10 minutes. After removal and rinsing, it was immersed for 10 minutes in a saturated silver nitrate solution in methanol. The plastic was then dried at 67° C for 15 minutes. The plate produced was initially colorless, but turned a dark brown shade upon exposure, at a distance of about 2 inches, to ultraviolet light produced by two 15-watt Blacklight lamps (F15T8. BLB manufactured by General Electric Corporation), having an output of approximately 3 milliwatts per $cm^2$ in the 3000-4000 Angstrom range. The sample showed complete recovery at room temperature in approximately 30 minutes.

EXAMPLE 5

To 20 g of the Bioplastic polyester resin described above, 12 g of acrylic acid and 8 g of dipropylene glycol were added together with 2.8 g of methyl ethyl ketone peroxide. After gellation, the plastic plate was picked from the mold and allowed to cure at room temperature for 16 hours; it was subsequently post cured at 67° C for 5 hours.

The plate was then immersed in methanol saturated with sodium chloride for 10 minutes. It was removed, rinsed, and subsequently immersed in methanol saturated with silver nitrate for 10 minutes, after which it was removed, rinsed again, and dried for 15 minutes at 67° C.

The colorless plate showed a strong photocoloration with a recovery rate of approximately 10 minutes.

EXAMPLE 6

To 20 g of Bioplastic were added 20 g of acrylic acid and 2.8 g of methyl ethyl keton peroxide. The 3 mm thick plate produced was cured at room temperature for 40 hours. The immersion treatment was the same as in example 5. The sample showed strong photocoloration and fast recovery (10 minutes) at room temperature.

EXAMPLE 7

24 g of Bioplastic were added together with 14 g of 3-methacrylic acid and 2.8 g of methyl ethyl ketone peroxide. A 3 mm thick plastic plate obtained from the above mixture, after curing at room temperature for 40 hours, was immersed in a 20% cupric chloride solution in methanol for 12 minutes. After thorough rinsing with methanol, it was subsequently immersed in a saturated solution of silver nitrate in methanol for 12 minutes. The plate was rinsed again and dried at 65° C for ½ hour. Its photochromic properties were similar to those of the plate of example 1.

EXAMPLE 8

The procedure of example 7 was repeated except that in place of the 3-methacrylic acid, vinylacetic acid was used. The photochromic properties of the plastic were similar to those of example 1.

EXAMPLE 9

A solution of polyester resin was first prepared by mixing 70 g of poly(oxydiethylene maleate) and 30 g of styrene. The poly(oxydiethylene maleate) was prepared by the condensation of diethylene glycol and maleic anhydride by well-known methods.

A polymer mixture was then prepared by dissolving 15 g of acrylic acid in 25 g of the above polyester formulation. This mixture was then catalyzed with 1.0 g of benzoyl peroxide, and the prepolymer mixture poured into a glass lens-shaped (6-base) mold with internal thickness of 2 mm. After allowing 2 hours for the mixture to reach a firm gel state the plastic plano lens was picked from the mold and allowed to sit at room temperature for 48 hours.

The immersion solutions and procedures were the same as that of example 1 yielding a light blue colored lens which turned brown upon exposure to sunlight. It recovered its original transparency indoors in approximately 30 minutes.

EXAMPLE 10

Twenty grams of the polyester-styrene mixture of example 9 were mixed with 20 g of 3-methacrylic acid and catalyzed with 1.0 g of benzoyl peroxide. The prepolymer mixture was cast in a glass lens-shaped mold with an internal thickness of 2 mm. The plastic lens was allowed to cure at room temperature for 20 hours. The lens was postcured for 3 hours at 65° C. The immersion solutions and imbibing procedures were the same as those given in example 4. The initially colorless lens turned a dark brown color within 3 minutes' exposure to bright sunlight and was nearly completely recovered when shielded from the sun in approximately 45 minutes at 75° C.

EXAMPLE 11

A polyester resin based on poly(ethylene-oxydiethylene maleate-phthalate-adipate) and styrene was prepared in the conventional manner by reacting 85 g ethylene glycol, 146 g diethylene glycol, 171 g maleic anhydride, 56 g phthalic anhydride, and 55 g adipic acid. One-hundred grams of the above-reacted mixture was dissolved in 43 g of styrene to provide the working polyester formulation.

A polymerizing mixture was next prepared by dissolving 10 g of acrylic acid and 30 g of the above polyester formulation. The mixture was catalyzed with 1.0 g of a 60% solution of methyl ethyl keton hydroperoxide in dimethyl phthalate (Lupersol DDM). The prepolymer mixture was cast in a flat glass mold of 3 mm internal thickness and allowed to cure at room temperature for 3 hours giving a hard, colorless plastic plate.

The immersion solution and imbibing procedure were the same as those given in example 4. The initially colorless plate turned a reddish brown shade upon exposure to ultraviolet light for several minutes and returned to its original colorless condition when placed in the dark at room temperature for 1 hour.

EXAMPLE 12

Twenty grams of the polyester formulation of example 11 were mixed with 20 g of 4-vinylpepidine and 1.0 g of Lupersol DDM.

The polymerizing mixture was cast in a lens-shaped glass mold and allowed to cure for 1.5 hours at room temperature. The plastic lens thus formed was immersed in methanol saturated with sodium bromide for 5 minutes. After rinsing with methanol it was subsequently immersed in methanol saturated with silver nitrate for 5 minutes, rinsed thoroughly and dried for 15 minutes at 67° C.

The lens changed from a light yellow color to a dark brown shade in sunlight and recovered in approximately 20 minutes.

EXAMPLE 13

Fifteen grams of acrylic acid were dissolved in 25 g of diallyl diglycol carbonate (CR-39). The mixture was catalyzed using 2.0 g of isopropyl percarbonate poured into a lens-shaped glass mold of 2 mm internal thickness and heated at 60° C for 30 minutes, followed by 75° C for 40 minutes.

The immersion procedure was the same as that described in example No. 1 with the lens exhibiting photochromic properties similar to the plastic plate of example No. 1.

EXAMPLE 14

The same as example 13; however, the immersion procedure of example 4 was employed. The resultant lens exhibited photochromic properties similar to photochromic plastic plate of example 4.

EXAMPLE 15

The same as example 14; however, the lens was additionally immersed for 1 minute in an aqueous dispersion of Eastman Fast Blue B-GLF. The resulting lens was a blue shade before activation but turned a dark gray color upon exposure to bright sunlight for 3 to 4 minutes and recovered in the dark.

The invention may be embodied in other specific forms without departing from the spirit or essential characteristics there of. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for producing a photochromic plastic material characterized by the steps of:
   forming a transparent polymeric material from:
   a first component consisting essentially of at least one unsaturated polyester resin produced by esterification of a polybasic, unsaturated organic acid with a polyhydric alcohol, and
   a second component consisting essentially of a polar vinyl monomer;
   contacting said material with a solvent to swell a surface layer thereof;

contacting said surface layer with halide ions chosen from the group consisting of chloride, iodide, bromide, and mixtures thereof;

contacting said surface layer with silver ions; and removing retained solvents from said material to collapse said swelled surface layer.

2. The process as set forth in claim 1 wherein said polar vinyl monomer is selected from the group consisting of N-vinyl pyrrolidone, vinyl acetate, vinyl succinamide, vinyl phthalimide, acrylic acid, 2-methacrylic acid, 3-methacrylic acid, vinyl-acetic acid, 3-vinylpropionic acid, 4-vinylpyridine, 5-vinyl 2-picoline, vinylformamide, vinylacetonitrile, acrylamide, and mixtures thereof.

3. The process as set forth in claim 1 wherein said polybasic unsaturated organic acid is selected from the group consisting of maleic acid, fumaric acid, and mixtures thereof.

4. The process as set forth in claim 1 wherein said polyhydric alcohol is selected from the group consisting of ethylene glycol, diethylene glycol, 2'2' dimethyl propanediol, and mixtures thereof.

5. The process as set forth in claim 1 wherein said halide and silver ions are dissolved in a low molecular weight alcohol.

6. The process as set forth in claim 5 wherein said low molecular weight alcohol is methanol.

7. The process as set forth in claim 1 wherein said first component is selected from the group consisting of resins consisting of diethylene glycol bis (allyl carbonate), diallyl maleate, diallyl fumarate, diallyl benzene phosphonate, and mixtures thereof copolymerized with between 0 and about 70% of at least one unsaturated vinyl monomer.

8. The process as set forth in claim 7 wherein said first component consists essentially of diethylene glycol bis (allyl carbonate) copolymerized with between 5 and 50% of an unsaturated vinyl monomer.

9. The process as set forth in claim 1 wherein said first component is copolymerized with between 0 and 70% of an unsaturated vinyl monomer selected from the group consisting of styrene, vinyl toluene, acrylic esters, methacrylic esters, and mixtures thereof.

10. The process as set forth in claim 1 wherein the mass ratio of said first component to said second component is between 0.1 and 100.

11. The process as set forth in claim 1 wherein said forming step is effected by mixing said first and second component in a mold in the presence of an initiator chosen from the group consisting of acetyl benzoyl peroxide, peracetic acid, methyl ethyl ketone peroxide, cyclohexanone peroxide, and cyclohexyl peroxide.

12. A process for producing a photochromic coating on the surface of an article, said process being characterized by the steps of:

forming a transparent polymeric coating on said article from:
a first component consisting essentially of at least one unsaturated polyester resin produced by esterification of a polybasic, unsaturated organic acid with a polyhydric alcohol, and
a second component consisting essentially of a polar vinyl monomer;

contacting said coating with a solvent to swell a surface layer thereof;

contacting said surface layer with halide ions chosen from the group consisting of chloride, iodide, bromide, and mixtures thereof;

contacting said surface layer with silver ions; and removing retained solvents from said coating to collapse said swelled surface layer.

13. The process as set forth in claim 12 wherein said polar vinyl monomer is selected from the group consisting of N-vinyl pyrrolidone, vinyl acetate, vinyl succinamide, vinyl phthalimide, acrylic acid, 2-methacrylic acid, 3-methacrylic acid, vinyl-acetic acid, 3-vinylpropionic acid, 4-vinylpyridine, 5-vinyl 2 picoline, vinylformamide, vinylacetonitrile, acrylamide, and mixtures thereof.

14. The process as set forth in claim 12 wherein said polybasic unsaturated organic acid is selected from the group consisting of maleic acid, fumaric acid, and mixtures thereof.

15. The process as set forth in claim 12 wherein said polyhydric alcohol is selected from the group consisting of ethylene glycol, diethylene glycol, 2'2' dimethyl propanediol, and mixtures thereof.

16. The process as set forth in claim 12 wherein said halide and silver ions are dissolved in a low molecular weight alcohol.

17. The process as set forth in claim 16 wherein said low molecular weight alcohol is methanol.

18. The process as set forth in claim 12 wherein said first component is selected from the group consisting of resins consisting of diethylene glycol bis (allyl carbonate), diallyl maleate, diallyl fumarate, diallyl benzene phosphonate, and mixtures thereof copolymerized with between 0 and about 70% of at least one unsaturated vinyl monomer.

19. The process as set forth in claim 18 wherein said first component consists essentially of diethylene glycol bis (allyl carbonate) copolymerized with between 5 and 50% of an unsaturated vinyl monomer.

20. The process as set forth in claim 12 wherein said first component is copolymerized with between 0 and 70% of an unsaturated vinyl monomer selected from the group consisting of styrene, vinyl toluene, acrylic esters, methacrylic esters, and mixtures thereof.

21. The process as set forth in claim 12 wherein the mass ratio of said first component to said second component is between 0.1 and 100.

* * * * *